(12) United States Patent
Biles et al.

(10) Patent No.: US 9,569,365 B2
(45) Date of Patent: Feb. 14, 2017

(54) STORE-EXCLUSIVE INSTRUCTION CONFLICT RESOLUTION

(75) Inventors: Stuart David Biles, Cambridge (GB); Richard Roy Grisenthwaite, Cambridge (GB); Bruce James Mathewson, Cambridge (GB)

(73) Assignee: ARM Limited, Cambridge (GB)

( * ) Notice: Subject to any disclaimer, the term of this patent is extended or adjusted under 35 U.S.C. 154(b) by 232 days.

(21) Appl. No.: 14/113,723

(22) PCT Filed: May 21, 2012

(86) PCT No.: PCT/GB2012/051144
§ 371 (c)(1),
(2), (4) Date: Oct. 24, 2013

(87) PCT Pub. No.: WO2012/164257
PCT Pub. Date: Dec. 6, 2012

(65) Prior Publication Data
US 2014/0052921 A1    Feb. 20, 2014

(30) Foreign Application Priority Data

May 27, 2011  (GB) .................................. 1108988.5

(51) Int. Cl.
*G06F 12/0875* (2016.01)
*G06F 12/08* (2016.01)
(Continued)

(52) U.S. Cl.
CPC ......... *G06F 12/0875* (2013.01); *G06F 9/3004* (2013.01); *G06F 9/3834* (2013.01); *G06F 12/0815* (2013.01); *G06F 12/0817* (2013.01)

(58) Field of Classification Search
None
See application file for complete search history.

(56) References Cited

U.S. PATENT DOCUMENTS

| 5,428,761 A | 6/1995 | Herlihy et al. |
| 7,398,355 B1 | 7/2008 | Moir et al. |

(Continued)

OTHER PUBLICATIONS

Out-of-Band signaling. (2001). In F. Hargrave, Hargrave's communications dictionary, wiley. Hoboken, NJ.*

(Continued)

*Primary Examiner* — Brian Peugh
*Assistant Examiner* — Dustin Bone
(74) *Attorney, Agent, or Firm* — Nixon & Vanderhye P.C.

(57) ABSTRACT

A data processing system includes a plurality of transaction masters, each with an associated local cache memory and coupled to coherent interconnect circuitry. Monitoring circuitry within the coherent interconnect circuitry maintains a state variable (flag) in respect of each of the transaction masters to monitor whether an exclusive store access state is pending for that transaction master. When a transaction master is to execute a store-exclusive instruction, then a current value of the subject state variable for that transaction master is compared with a previous value of that variable stored when the exclusive store access was setup. If there is a match, then store-exclusive instruction is allowed to proceed and the state variables of all other transaction masters for which there is a pending exclusive store access state are changed. If there is not a match, then the execution of the store-exclusive instruction is marked as failing.

19 Claims, 8 Drawing Sheets

Figure 1:
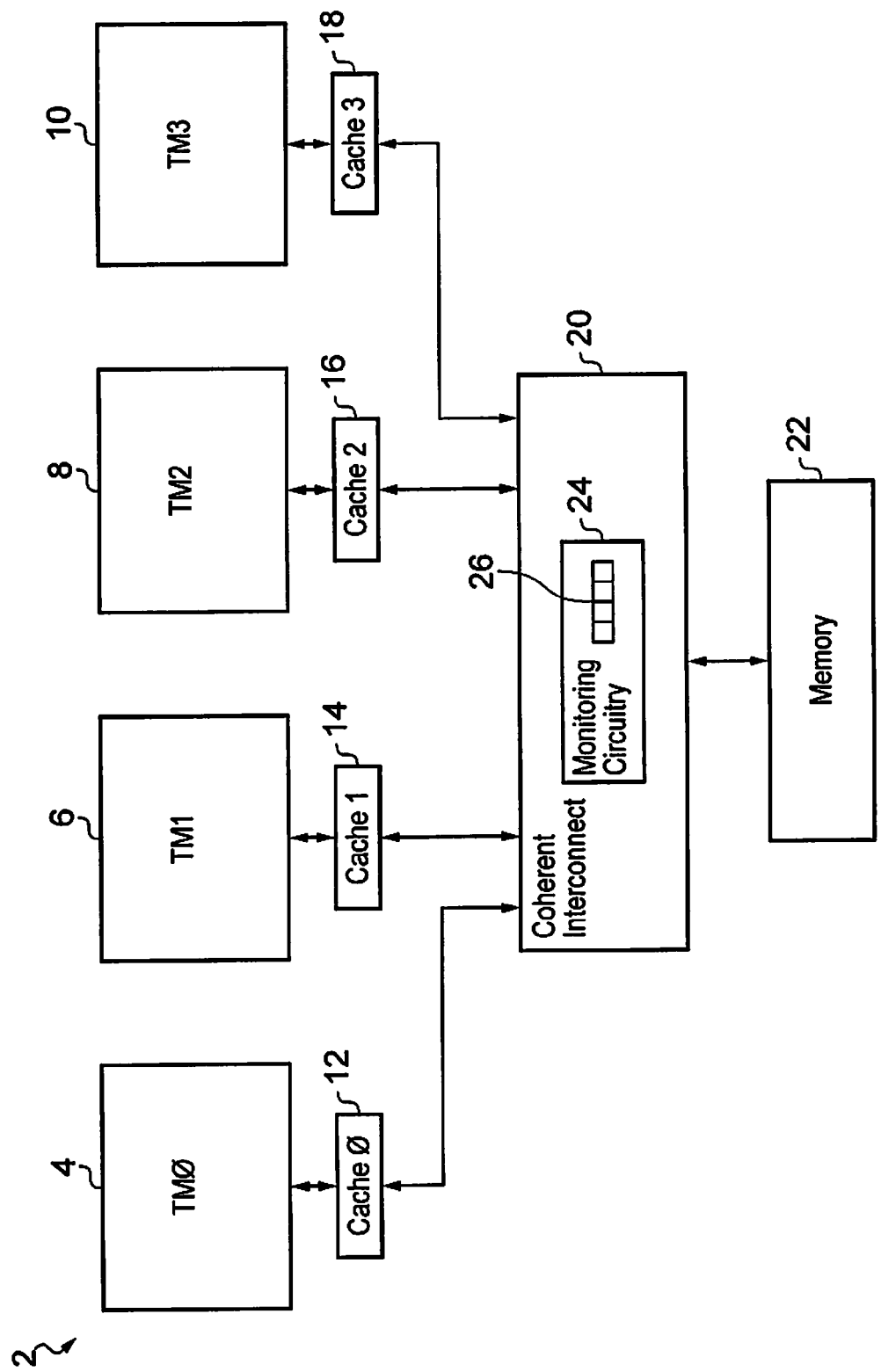

(51) Int. Cl.
    *G06F 9/38*     (2006.01)
    *G06F 9/30*     (2006.01)

(56)         References Cited

U.S. PATENT DOCUMENTS

2003/0041225 A1*   2/2003   Mattina et al. .................. 712/30
2003/0097531 A1*   5/2003   Arimilli et al. ............... 711/146
2007/0043933 A1    2/2007   Moir et al.
2008/0104332 A1    5/2008   Gaither et al.
2010/0169579 A1    7/2010   Sheaffer et al.

OTHER PUBLICATIONS

In-Band signaling. (2001). In F. Hargrave, Hargrave's communications dictionary, wiley. Hoboken, NJ.*
Implementation of atomic primitives on distributed shared memory multiprocessors. Michael, M.M. High-Performance Computer Architecture, 1995. Proceedings., First IEEE Symposium on.*
International Search Report for PCT/GB2012/051144, mailed Sep. 5, 2012.
UK Search Report for GB Application No. 1108988.5, dated Sep. 16, 2011.
Michael, M.M. et al., "Implementation of atomic primitives on distributed shared memory multiprocessors", High-Performance Computer Architecture, (Jan. 22, 1995), pp. 223-231.

* cited by examiner

STORE-EXCLUSIVE INSTRUCTION CONFLICT RESOLUTION

This application is the U.S. national phase of International Application No. PCT/GB2012/051144, filed 21 May 2012, which designated the U.S. and claims priority to GB Patent Application No. 1108988.5, filed 27 May 2011, the entire contents of each of which are hereby incorporated by reference.

This invention relates to the field of data processing systems. More particularly, this invention relates to data processing systems supporting store-exclusive program instructions.

It is known to provide data processing systems that support store-exclusive program instructions (these are sometimes referred to as Load-linked/Store-conditional or Load Exclusive/Store Exclusive instructions). Such store-exclusive instructions are normally used in combination with a load-exclusive instruction within multiprocessing systems so as to control exclusive store access to a data value (to the exclusion of other processors) for a period of time; typically, a short period of time. An example of such load-exclusive program instructions and store-exclusive program instructions are the LDREX and STREX instructions in some of the processors designed by ARM Limited of Cambridge, England. A description of these instructions and their functionality may be found in the ARM Architecture Reference Manual.

It is known to connect different processors, each having their own local cache memory, within a multiprocessor system using interconnect circuitry that provides support for maintaining data coherency within the system. The individual processors may be arranged to access a shared memory system via the interconnect circuitry and the interconnect circuitry may monitor the content of the local cache memories of each of the processors and pass messages between these cache memories so as to maintain coherency, e.g. invalidate a copy of data held in one cache memory when that data is updated in a different cache memory or in the shared memory system.

If more than one processor seeks to use the load-exclusive and store-exclusive program instruction mechanisms to provide guaranteed exclusive access to a data value for a period of time, then the interconnect circuitry is used to communicate signals and perform processing operations to police this behaviour. When more than one processor seeks to establish exclusive access to the same data, or the same range of data, then the interconnect circuitry may be configured to arbitrate between the processors such that one of the processors is successful in performing its load-exclusive and store-exclusive operations while the other processor fails in at least its attempt to perform one of the operations.

Viewed from one aspect the present invention provides a method managing data coherency within a data processing apparatus having a plurality of transaction masters, including a subject transaction master, said method comprising performing in respect of each of said plurality of transaction masters serving as a subject transaction master the steps of:
  setting a subject state variable and a subject control value to match so as to indicate an exclusive store access state to subject data within a subject cache memory coupled to said subject transaction master; and
  in response to a store-exclusive instruction for execution by said subject transaction master:
    comparing a store address of a store data value associated with said store-exclusive instruction with addresses of data values stored within said subject cache memory to determine if said store data value is currently stored within said target cache memory and is valid;
    if said stored data value is not marked as valid within said subject cache memory, then marking as failed execution of said store-exclusive instruction; and if said stored data value is valid within said subject cache memory, then:
      (i) comparing a current value of said subject state variable with said subject control value;
      (ii) if said current value does not match said subject control value, then marking as failed execution of said store-exclusive instruction; and
      (iii) if said current value does match said subject control value, then permitting execution of said store-exclusive instruction to pass and changing, for each other transaction master of said plurality of transaction masters using a current value of a state variable to track an exclusive store access state of said other transaction master and corresponding to said store address, one of said current value and a state variable associated with said other transaction master such that a subsequent store-exclusive instruction for execution by said other transaction master and corresponding to said exclusive store access state will not be executed with success by said other transaction master.

The present techniques recognise that the finite delays imposed in the operation of the interconnect circuitry in arbitrating conflicts between different processors each seeking to establish its own load-exclusive and store-exclusive access to a data value that is shared may expose race conditions in these arbitration mechanism that should be addressed. In particular, it is possible for live-lock situations to arise in which LDREX-STREX sequences being executed on more than one processor conflict with each other, causing each processor's LDREX-STREX sequence to fail and retry repeatedly. For example, each of the processors is given permission by the interconnect circuitry to perform its store operation, but before this store operation can be performed, the relevant data is invalidated by a store-exclusive operation being performed on another processor, which in turn has its own store-exclusive operation invalidated by the first processor before it completes LDREX-STREX sequences are used to enforce short duration exclusive access to data values. Live-locks in such environments arise due to combinations of software and hardware conditions. The present technique addresses these problems by effectively providing a point of serialisation associated with subject data to be accessed and managed using a subject state variable, the subject state variable and subject control value being set equal when the exclusive store access is set up. When a processor wishes to perform its store-exclusive operation it checks whether or not the subject state variable and the subject control value are still equal. If they are not equal, then the store-exclusive operation is allowed to proceed and the current value of the subject state variable associated with any other transaction masters which are tracking an exclusive store access are changed such that when those other transaction masters subsequently check the value of their own state variable, the change will be noted and will indicate that a different transaction master has reached the point of serialisation ahead of them and that their own store-exclusive operation should fail. This avoids a live lock arising.

The step of setting the subject state variable to a subject control value could be performed in a variety of different ways. For example, it could be set when an instruction is fetched from a memory address associated with a previously encountered load-exclusive instruction/a store-exclusive instruction sequence, when a counter value forming the state variable has not been sampled for greater than a predetermined number of processing cycles, or in other ways. One effective way to control the step of setting is that this is performed in response to a load-exclusive instruction executed by the subject transaction master in which the load-exclusive instruction loads a data value to the subject cache memory coupled to the subject transaction master if the data value is not already present within that cache memory.

The marking of a store-exclusive instruction as either failed or permitted to pass may be achieved by recording a fail status or a pass status. These may be recorded, for example, in a result status register associated with the instructions.

The store-exclusive instruction may have a variety of forms. It may, for example, perform other operations, such as a compare, in addition to a simple store operation. However, the store-exclusive instruction in at least some embodiments performs a standard store operation if the data value is marked as valid within the cache and the current value matches the subject control value.

In order to assist in the management of coherency, if the current value does match the subject control value, then the system may mark as invalid any data value stored in the other transaction masters which corresponds to the store address of the data in respect of which the store-exclusive access has been permitted. Conversely, if the current value does not match the subject control value, then the system does not perform any such invalidate operations so avoid a potential cause of live locks The state variable which is used to track pending store exclusive access state can take a variety of different forms. In some embodiments the state variable may have the form of a separate state variable provided for each of a plurality of transaction masters and tracking pending exclusive store states within those transaction masters. This set of separate state variables may be stored within coherency control circuitry which is shared between the plurality of transaction masters. In this context, the steps of comparing and changing are performed by the coherency control circuitry.

The subject control value may be a simple binary flag having a predetermined set state indicative of an exclusive store access state and with which the step of changing sets the current value of the state variable for each of the other transaction masters, to a predetermined reset state. Thus, for each transaction master the state variable is placed into a set state when the transaction master operates to set up an exclusive store access state and then before a store-exclusive instruction is allowed to proceed, a check is made as to whether or not the state variable still has the set state so as to check that it has not been reset by another transaction master which has prevailed in an arbitration between the present transaction master and that other transaction master.

It is possible that in some embodiments it will be sufficient to provide a single state variable for each transaction master indicating that an exclusive store access state is pending for that transaction master. However, more finegrained control which helps to reduce the likelihood of store-exclusive instructions being unnecessarily failed may be achieved when a plurality of separate state variables are provided for each of the transaction masters, with each of these separate state variables being associated with different address ranges of the data. Thus, two store-exclusive instructions being performed by different transaction masters will not interfere with each other if they are accessing two data values within different address ranges as different state variables may be used to separately track the potential conflicts between exclusive store access operations within those different address ranges.

In some embodiments the different address ranges may be fixed address ranges whereas in other embodiments it may be desirable to provide programmable (under hardware or software control) address ranges.

An alternative to the set and reset form of state variables, other embodiments may use counter values with the subject control value taking the form of the counter value and the subject state variable a sample of the counter value to be associated with an exclusive store access state. The counter value is shared by the plurality of transaction masters and is stored within the coherency control circuitry to provide a point of serialisation using which store-exclusive instructions from different transaction masters may be arbitrated. When a transaction master is successful in executing a store-exclusive instruction, the counter value is changed such that it no longer will match previously stored samples of the count value associated with pending exclusive store access states of other transaction masters.

The subject control value associated with the subject transaction master may be stored in different locations. It is convenient if this is stored within the subject cache memory of the subject transaction master, as exclusive store operations and exclusive load operations will typically be routed through this subject cache memory.

The counter value may be provided to the subject cache memory in a variety of different ways, including as a sideband signal, as an out-of-band signal and as a data payload within an in-band signal.

The setting of the subject state variable may be triggered in a variety of different ways as previously discussed. These include the fetching by the subject transaction master of an instruction from an address associated with a previously encountered load-exclusive instruction or a store-exclusive instruction. Another alternative is the decoding by the subject transaction master of one of a load-exclusive instruction or a store-exclusive instruction. A further alternative is that the counter value has not yet been sampled for greater than a predetermined number of processing cycles.

In a similar way to that in which a plurality of set and reset state variables may be associated with different address ranges, it is also possible to provide a plurality of counters which each of these plurality of counters being associated with different address ranges. The address ranges may again be fixed address ranges or programmable (by software or hardware mechanisms) address ranges.

The present techniques are also applicable to systems utilising hierarchies of transaction masters. Exclusive store access states and store exclusive instructions may be arbitrated within a cluster of transaction masters, with that cluster forming part of a system containing one or more further transaction masters. In this case, if a store-exclusive instruction is permitted within the cluster, then a further arbitration against potentially any overlapping exclusive store access state and store-exclusive instruction of the one or more further transaction masters may be performed using the same steps as are performed within the cluster, and as previously discussed.

The additional steps of checking the current value of the subject state variable may be bypassed if the stored data value is marked and valid and uniquely stored within the subject cache memory when the store-exclusive instruction is executed, as in this case there is no risk of the problems of overlapping in competing store-exclusive instructions as previously discussed.

Viewed from another aspect the present invention provides an apparatus for managing data coherency within a data processing apparatus having a plurality of transaction masters, including a subject transaction master, said apparatus comprising in respect of each of said plurality of transaction masters serving as a subject transaction master:
state setting circuitry configured to set a subject state variable and a subject control value to match so as to indicate an exclusive store access state to subject data within a subject cache memory coupled to said subject transaction master;
monitor circuitry configured to respond to a store-exclusive instruction for execution by said subject transaction master by:
comparing a store address of a store data value associated with said store-exclusive instruction with addresses of data values stored within said subject cache memory to determine if said store data value is currently stored within said target cache memory and is valid;
if said stored data value is not marked as valid within said subject cache memory, then marking as failed execution of said store-exclusive instruction; and if said stored data value is valid within said subject cache memory, then:
(i) comparing a current value of said subject state variable with said subject control value;
(ii) if said current value does not match said subject control value, then marking as failed execution of said store-exclusive instruction; and
(iii) if said current value does match said subject control value, then permitting execution of said store-exclusive instruction and changing, for each other transaction master of said plurality of transaction masters using a current value of a state variable to track an exclusive store access state of said other transaction master and corresponding to said store address, one of said current value and a state variable associated with said other transaction master such that a subsequent store-exclusive instruction for execution by said other transaction master and corresponding to said exclusive store access state will not be executed with success by said other transaction master.

Viewed from a further aspect the present invention provides an apparatus for managing data coherency within a data processing apparatus having a plurality of transaction masters, including a subject transaction master, said apparatus comprising in respect of each of said plurality of transaction masters serving as a subject transaction master:
state setting means for setting a subject state variable and a subject control value to match so as to indicate an exclusive store access state to subject data within a subject cache memory coupled to said subject transaction master;
monitor means for responding to a store-exclusive instruction for execution by said subject transaction master by:
comparing a store address of a store data value associated with said store-exclusive instruction with addresses of data values stored within said subject cache memory to determine if said store data value is currently stored within said target cache memory and is valid;
if said stored data value is not marked as valid within said subject cache memory, then marking as failed execution of said store-exclusive instruction; and
if said stored data value is valid within said subject cache memory, then:
(i) comparing a current value of said subject state variable with said subject control value;
(ii) if said current value does not match said subject control value, then marking as failed execution of said store-exclusive instruction; and
(iii) if said current value does match said subject control value, then permitting execution of said store-exclusive instruction and changing, for each other transaction master of said plurality of transaction masters using a current value of a state variable to track an exclusive store access state of said other transaction master and corresponding to said store address, one of said current value and a state variable associated with said other transaction master such that a subsequent store-exclusive instruction for execution by said other transaction master and corresponding to said exclusive store access state will not be executed with success by said other transaction master.

Figure 2:
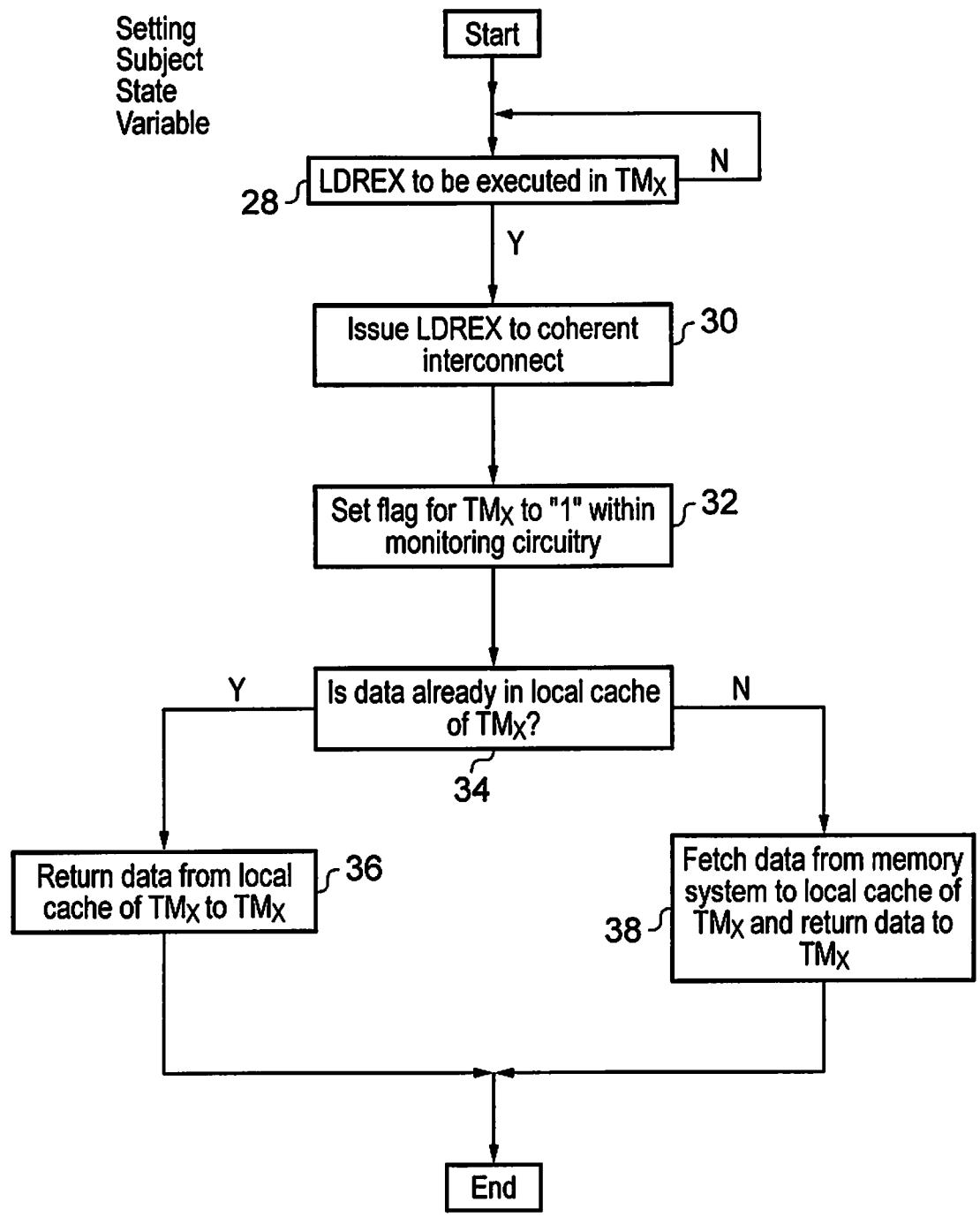
Figure 3:
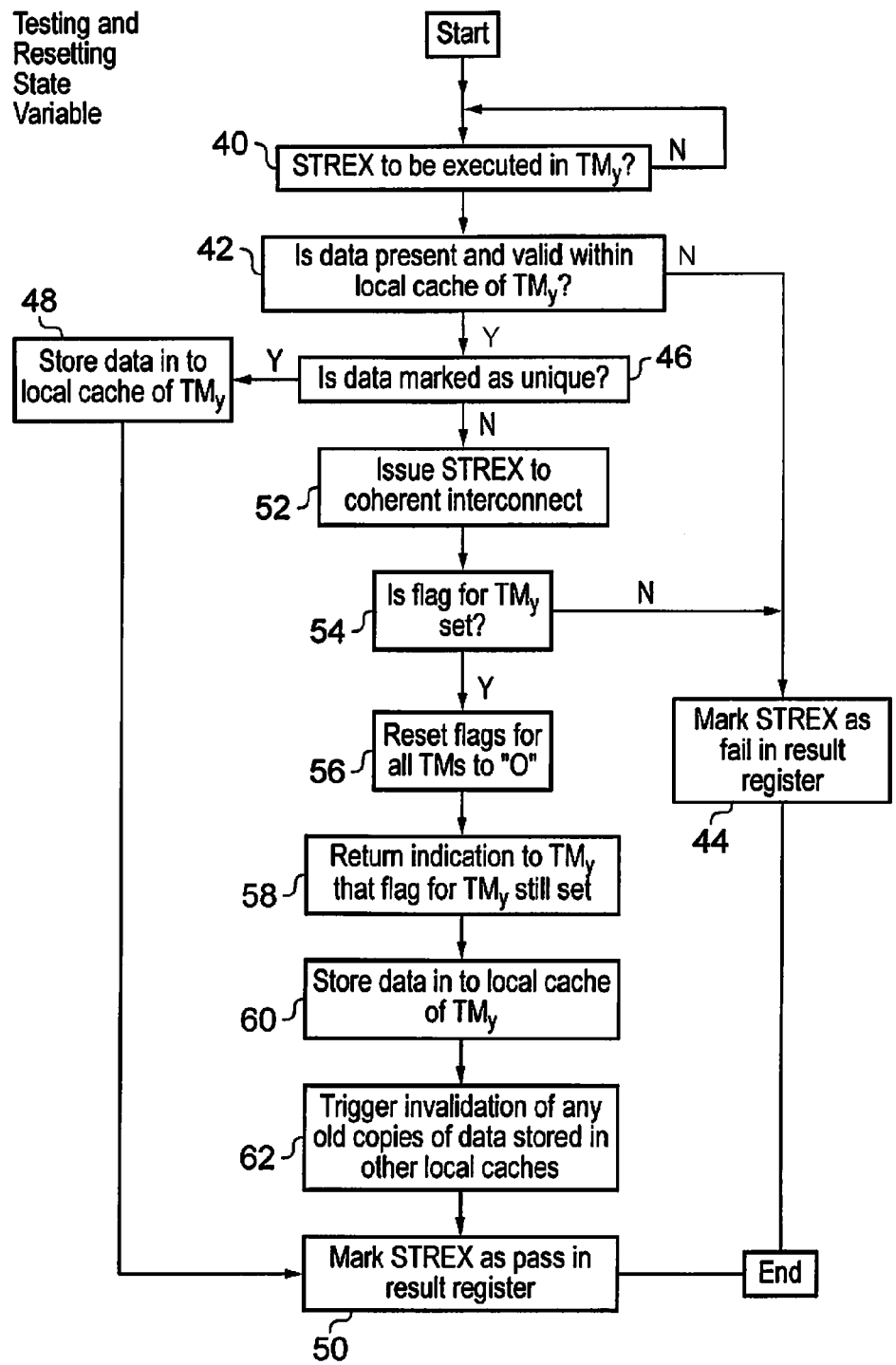
Figure 4:
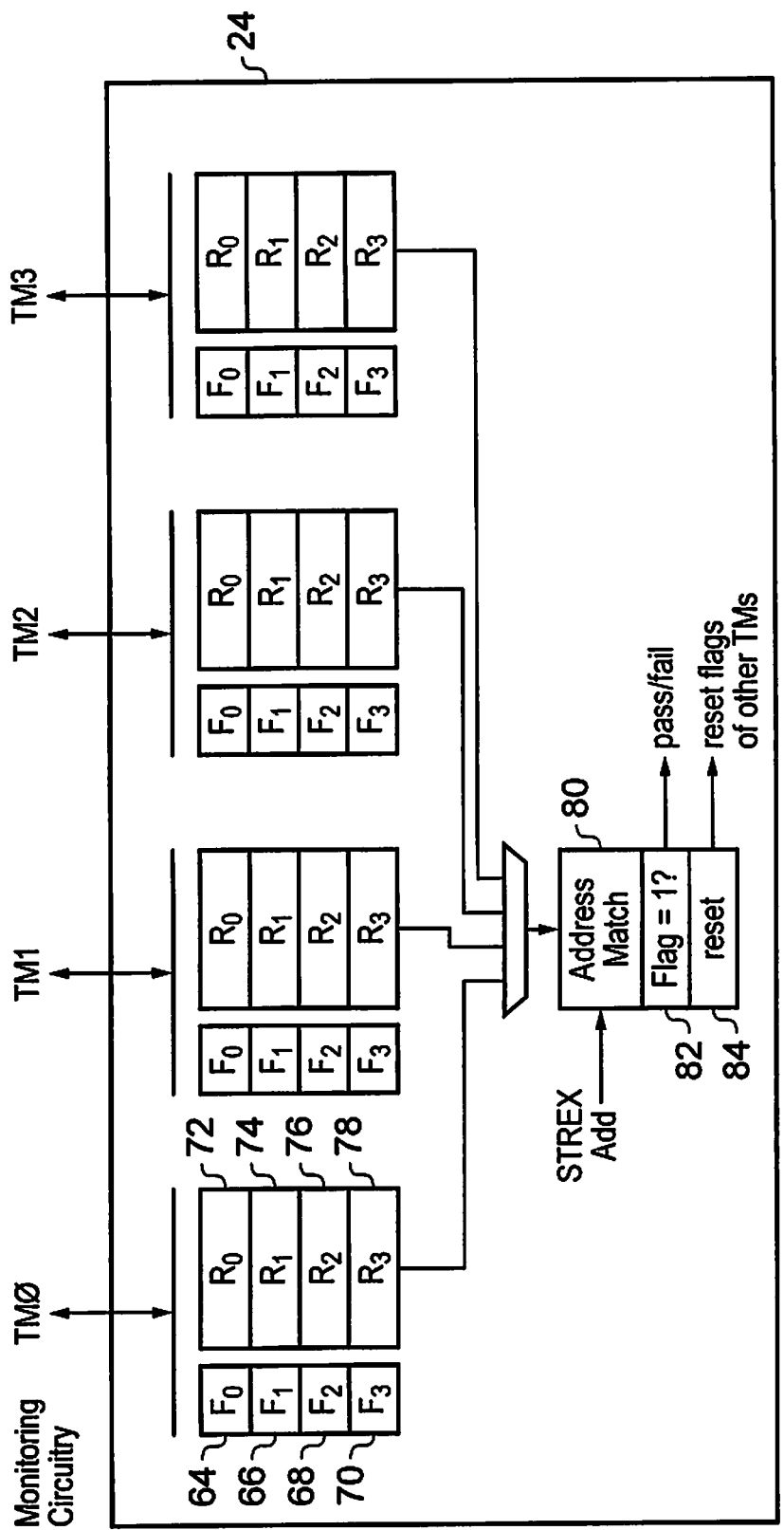
Figure 5:
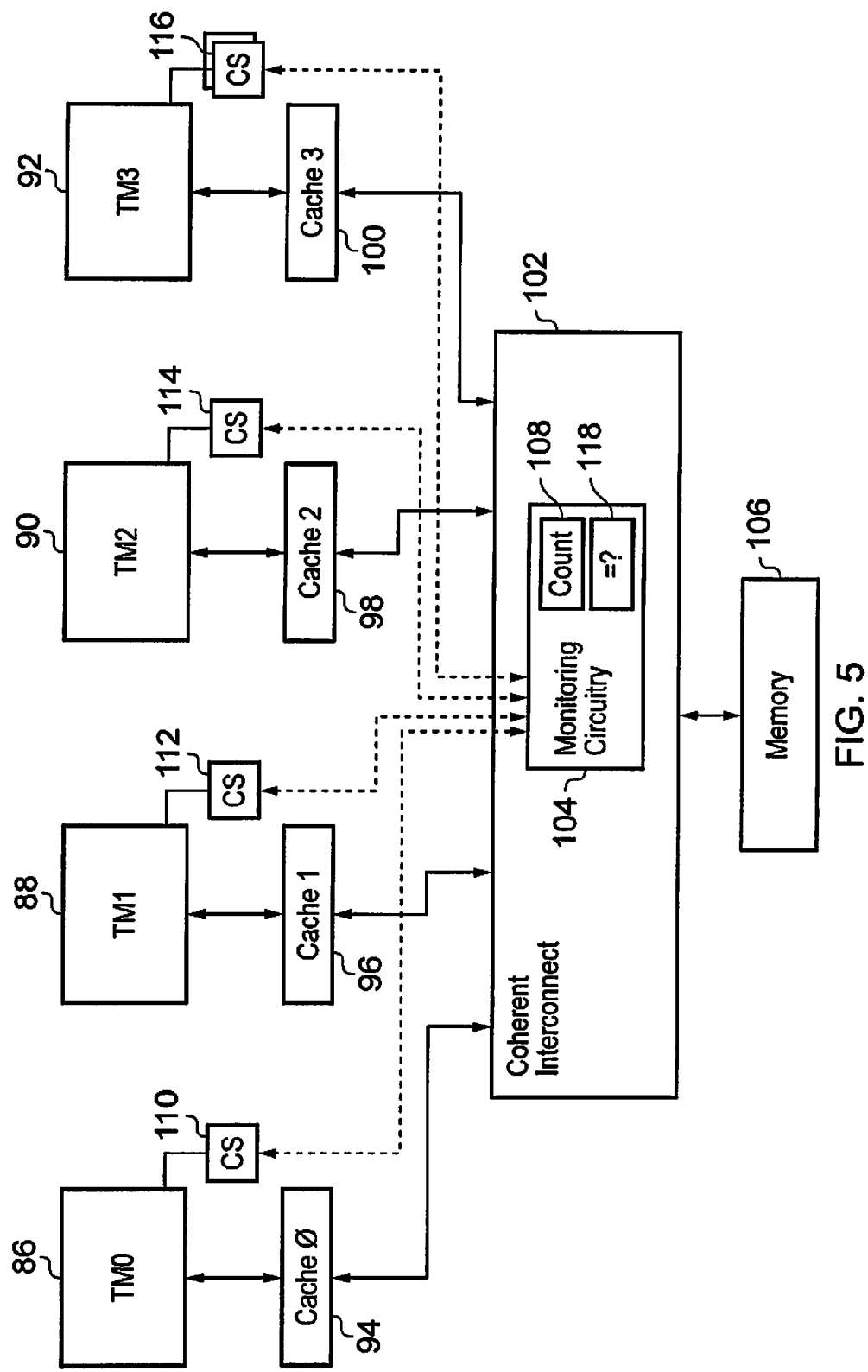
Figure 6:
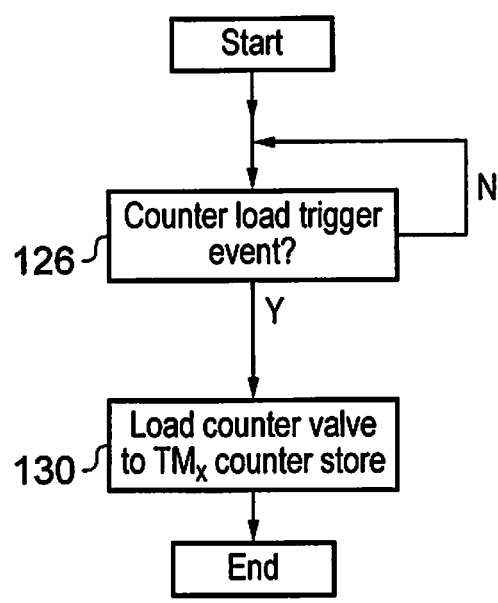
Figure 7:
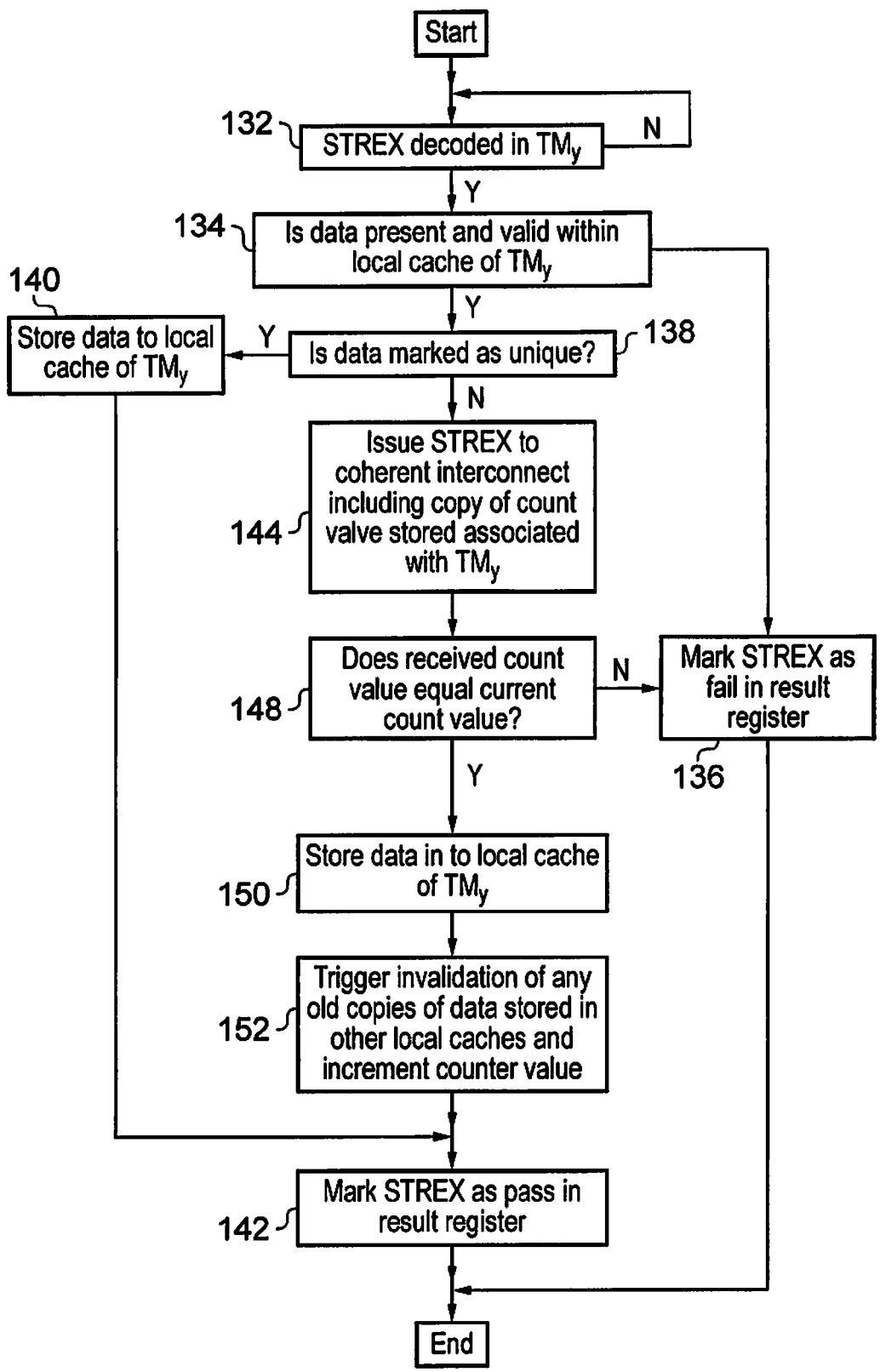
Figure 8:
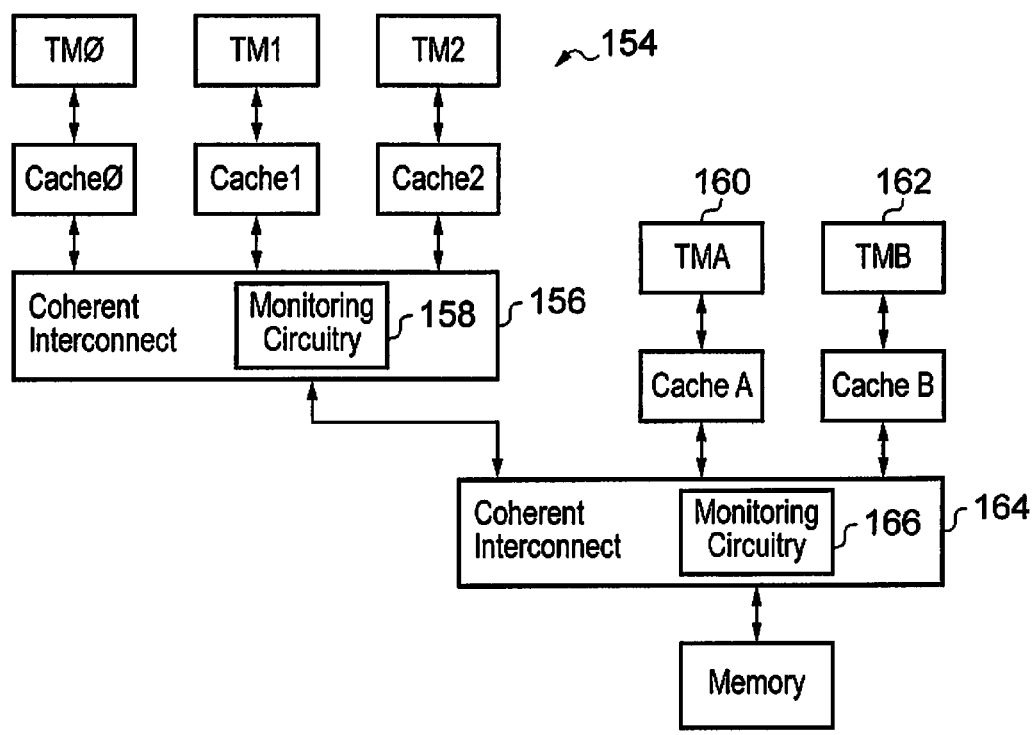

Embodiments of the invention will now be described, by way of example only, with reference to the accompanying drawings in which:

FIG. 1 schematically illustrates a plurality of transaction masters coupled to coherent interconnect circuitry and communicating with a memory;

FIG. 2 schematically illustrates the setting of a subject state variable in response to a load-exclusive instruction;

FIG. 3 schematically illustrates testing and resetting of a state variable in response to a store-exclusive program instruction;

FIG. 4 schematically illustrates monitoring circuitry in which a plurality of state variables are maintained for each transaction master and the different state variables are each associated with different ranges of memory address;

FIG. 5 schematically illustrates a second example embodiment in which the state variable tracked takes the form of a counter value;

FIG. 6 is a flow diagram schematically illustrating the process of setting a subject state variable to a current counter value;

FIG. 7 is a flow diagram schematically illustrating the response to a store-exclusive instruction in a system using a counter as the state variable being tracked; and FIG. 8 schematically illustrates a hierarchy of transaction masters in which a cluster of transaction masters performs intra-cluster arbitration and then further arbitration is provided against other transaction masters within the system.

FIG. 1 schematically illustrates a data processing system 2 including a plurality of transaction masters 4, 6, 8, 10 each having an associated local cache memory 12, 14, 16, 18. Coherent interconnect circuitry 20 is provided to manage coherence between the data stored within the local cache memories 12, 14, 16, 18 and to communicate with a memory system 22 (e.g. subsequent levels of cache memory, a volatile main memory and non-volatile storage). The transaction masters 4, 6, 8, 10 may take the form of general purpose processor cores, such as the processor cores designed by ARM Limited of Cambridge, England, or other forms of processing device such as DSP devices, graphics processing units and the like.

In this example embodiment, each of the transaction masters 4, 6, 8, 10 has an associated local cache memory 12, 14, 16, 18 into which data values stored within the memory 22 may be cached for high speed local access. The loading and storing of data values from the memory 22 is conducted via the coherent interconnect circuitry 20. The coherent interconnect circuitry 20 manages data coherence between the local cache memories 12, 14, 16, 18. As will be appreciated by those in this technical field, multiple copies of data held within the memory 22 may be separately cached within the individual local cache memories 12, 14, 16, 18. If one of the transaction masters 4, 6, 8, 10 updates its local copy of the data held within its respective local cache memory 12, 14, 16, 18, then coherence operations are required, such as invalidating the data stored within the other cache memories or updating the data stored within the other cache memories.

The transaction masters 4, 6, 8, 10 include provision for executing store-exclusive instructions and load-exclusive instructions. This type of instruction is described in the ARM Architecture Reference Manual produced by ARM Limited of Cambridge, England. The load-exclusive instruction is an LDREX instruction and the store-exclusive instruction is an STREX instruction. The definition of these instructions, the architectural behaviour of these instructions and example pseudo-code for using these instructions is described in the ARM Architecture Reference Manual, the content of which is incorporated herein by reference.

Also illustrated in FIG. 1 is monitoring circuitry 24 including a register 26 storing flag values which serve as state variables for monitoring an exclusive access state of associated respective transaction masters 4, 6, 8, 10. This monitoring circuitry 24 is useful in providing a point of serialisation for store-exclusive instructions and thereby helping to avoid live-lock situations as will be described further below, i.e. by ensuring that store-exclusive instructions have a well defined serial order and that a store-exclusive instruction is not prevented from successfully executing by another store-exclusive instruction later in the serial order.

FIG. 2 is a flow diagram schematically illustrating the setting of a subject state variable in response to an LDREX instruction. At step 28 the process waits until an LDREX instruction is to be executed in one of the transaction masters 4, 6, 8, 10. When such an LDREX instruction is decoded, then step 30 issues signals indicating this to the coherent interconnect circuitry 20. At step 32 the monitoring circuitry 24 within the coherent interconnect circuitry 20 responds to notification that an LDREX instruction has been decoded within one of the transaction masters 4, 6, 8, 10 by setting the flag associated with that transaction master to a value of "1". This flag serves as a subject state variable for the associated transaction master and tracks the exclusive store access state of that subject transaction master 4, 6, 8, 10. Step 34 determines whether or not the data subject to the LDREX instruction is already loaded within the local cache of the transaction master 4, 6, 8, 10 that is executing that LDREX instruction. If the data is already loaded within the local cache 12, 14, 16, 18 of the transaction master 4, 6, 8, 10 that is executing that LDREX instruction, then step 36 returns this data to the transaction master 4, 6, 8, 10 from that local cache 12, 14, 16, 18 concerned. If the data is not already stored within the local cache 12, 14, 16, 18 of the transaction master 4, 6, 8, 10 that is executing the LDREX instruction, then step 38 serves to fetch the data from the memory 22 and store the data into the local cache 12, 14, 16, 18 concerned as well as returning the data to the transaction master 4, 6, 8, 10 that is executing the LDREX instruction.

In other embodiments a different flow could be followed in which the local cache is first checked to see if the data is present and in response to this one of two transactions sent to the coherent interconnect: (1) cache hit→send "set flag" message and return no data; (2) cache miss→send "read and set flag" message returning required data.

It will be appreciated that in addition to the operations illustrated in FIG. 2, further steps will be taken to monitor the status of the data loaded within the local cache 12, 14, 16, 18 and the coherence between local caches 12, 14, 16, 18, these techniques may include ones tracking the validity of the data within the local caches 12, 14, 16, 18, the shared or exclusive status of data within the local caches 12, 14, 16, 18, the modified "dirty" data of the data within the local caches 12, 14, 16, 18 and the like.

FIG. 3 is a flow diagram schematically illustrating the testing and resetting of a state variable tracking exclusive access status. At step 40 processing waits until an STREX instruction is to be executed by one of the transaction masters 4, 6, 8, 10. Step 42 then determines whether or not the data having address within the memory 22 corresponding to the STREX is present and valid within the local cache 12, 14, 16, 18 of the transaction master 4, 6, 8, 10 in which that STREX instruction has been decoded. If the data concerned is not present within that local cache 12, 14, 16, 18, then processing proceeds to step 44 where the STREX instruction is marked as failing by returning a result value indicative of this fail status within a result register (e.g. a general purpose register with a processor core) associated with the STREX instruction.

If the test at step 42 indicates that the data is present and valid within the local cache 12, 14, 16, 18 of the transaction master 4, 6, 8, 10, then processing proceeds to step 46 where a determination is made as to whether or not that data is marked as being unique, i.e. only stored within that local cache 12, 14, 16, 18. If the data is marked as unique, then there is no coherency issue to be managed and processing can proceed to step 48 where the data is stored into the local cache 12, 14, 16, 18 of the transaction master 4, 6, 8, 10 overwriting whatever value was previously stored for that data. In some embodiments a message may also be sent to the coherent interconnect to clear any flag associated with this transaction master and tracking an exclusive store access state. Processing then proceeds to step 50 where the STREX instruction is marked as passing by returning a value indicative of this pass in the result register associated with the STREX instruction as discussed in connection with step 44.

If the determination at step 46 is that the data is not marked as unique, then processing proceeds to step 52 where a signal indicative of the decoding of the STREX instruction at step 40 is passed to the coherent interconnect circuitry 20, and more particularly to the monitoring circuitry 24. Step 54 then determines whether or not the flag within the register 26 corresponding to the transaction master 4, 5, 8, 10 in which the STREX instruction is to be executed is set, i.e. has a value of "1". If this flag is still set, then it indicates that another transaction master 4, 6, 8, 10 has not reset this flag due to that other transaction master 4, 6, 8, 10 at least partially executing, its own STREX instruction. If the flag is not set, then the STREX instruction is later than another STREX instruction, which has prevailed in any arbitration (e.g. managed to reset the flags of the other transaction masters 4, 6, 8, 10 first) and accordingly processing proceeds to step 44 where the present STREX instruction is failed.

If the determination at step 54 is that the flag for the subject transaction master 4, 6, 8, 10 is still set (i.e. a match), then step 56 serves to reset this flag as well as resetting the flags of all of the other transaction masters 4, 6, 8, 10.

Resetting of the flags of all the other transaction masters 4, 6, 8, 10 will prevent those other transaction masters 4, 6, 8, 10 from successfully executing an STREX instruction if a store exclusive operation is currently pending within them. At step 58 an indication is returned to the subject transaction master 4, 6, 8, 10 that the flag for that subject transaction master is still set. Step 60 then stores the data which is subject to the STREX instruction into the local cache 12, 14, 16, 18 of the subject transaction master 4, 6, 8, 10. Step 62 triggers an invalidation operation of any old copies of the data which has just been stored into the local cache 12, 14, 16, 18 to take place within the other local cache memories 12, 14, 16, 18 of other transaction masters 4, 6, 8, 10 that may be storing corresponding copies. Step 50 then marks the STREX instruction as passing as previously discussed. If the determination at step 54 was that the flag was not set (i.e. no match), then processing proceeds via step 44 to the end and no invalidation of data in other caches 12, 14, 16, 18 is performed.

FIG. 4 schematically illustrates a variation of the monitoring circuitry 24, but in this case storing multiple state variables for each of the transaction masters 4, 6, 8, 10. In this example the monitoring circuitry 24 stores four flags 64, 66, 68, 70, one for each transaction master 4, 6, 8, 10. Each of these flags 64, 66, 68, 70 has an associated register 72, 74, 76, 78 storing data defining an associated range of address values for which the flag concerned monitors exclusive store access. There may also be no-address flags indicating that the flags 64, 66, 68, 80 are associated with the full memory address range. As illustrated in FIG. 4, when an STREX instruction is decoded, address matching circuitry 80 serves to determine which of the flags 64, 66, 68, 70 is associated with the address range within which the address of the STREX instruction falls. When this flag has been identified, then comparison circuitry 82 determines whether or not that flag value is still set and initiates a pass/fail response. If there is a pass response, then reset circuitry 84 resets all of the corresponding flags for other transaction masters which at least partially overlap with the address range for which the flag has been tested. This will have the result that when a STREX is later attempted for those other transaction masters, this will not execute with success, i.e. at least a result value indicating an execution fail will be returned in the result register for that STREX instruction.

It will be appreciated that the address ranges used by each of the transaction masters could be the same or could be different. In the example illustrated the address ranges are shown as separately defined for each transaction master, but in practice one set of programmable address ranges may be suitable for use by all of the transaction masters, and this would simplify implementation and operation.

FIG. 5 schematically illustrates a second example embodiment. In this example embodiment a plurality of transaction masters 86, 88, 90, 92 are again provided with local cache memories 94, 96, 98, 100. Coherency interconnect circuitry 102 containing monitoring circuitry 104 manages coherence among the local cache memories 94, 96, 98, 100. The coherent interconnect circuitry 102 also manages access to a main memory 106.

Compared to the embodiment of FIG. 1, in this example embodiment the monitoring circuitry 104 includes a counter 108 storing a count value which is incremented when a trigger event occurs. This trigger event may be the success of a STREX related transaction at the coherent interconnect circuitry 102. A further example of a trigger event is that the counter value has not been sampled for greater than a predetermined number of processing cycles, i.e. the counter value is periodically sampled. It will be appreciated that in the above the counter is described as changing by incrementing, but it will be appreciated that the counter could equally change by decrementing or by changing its value in some other way.

A counter store 110, 112, 114, 116 is associated with each of the transaction masters 86, 88, 90, 92. This counter store 110, 112, 114, 116 serves to retrieve a copy of the current value of the counter 108 from the monitoring circuitry 104 whenever it is desired to set the subject state variable of the transaction master 86, 88, 90, 92 concerned so as to monitor an exclusive store state for that transaction master 86, 88, 90, 92. These counter values can be transmitted in a number of ways, such as as a sideband signal, as an out-of-band signal upon the normal communication channel or as a data payload within an in-band signal on the normal communication channel. Other ways of communicating this counter value are also possible.

A comparator 118 is provided within the monitoring circuitry 104 and serves to compare a count value (subject state variable) stored within one of the counter stores 110, 112, 114, 116 of a transaction master 86, 88, 90, 92 attempting to execute on STREX instruction with a current value of the counter 108 (current value of subject control value). This provides a point of serialisation control on parallel store exclusive states within different transaction masters 86, 88, 90, 92 as described below.

The flow of operation may be as follows:

STREX being executed at $TM_x$

Check in cache to see if data valid→if not fail

Check to see if data unique→if unique complete internally

If not unique, send transaction to coherent interconnect including locally held copy of previously sampled counter value At monitoring circuitry compare the received count value with the current count value If equal, pass STREX, invalidate other copies held in other caches and increment counter 108

If not equal, fail STREX as another STREX has already passed, do not invalidate other copies and do not increment counter 108.

FIG. 6 is a flow diagram schematically illustrating the loading of a counter value into one of the counter stores 110, 112, 114, 116. Step 126 waits until a counter load trigger event occurs. This trigger event may be the fetching by one of the transaction masters 86, 88, 90, 92 of an instruction from an address that was previously identified as containing one of a load-exclusive instruction or a store-exclusive instruction. Another type of trigger event may be the execution by one of the transaction masters 86, 88, 90, 92 of a load-exclusive instruction. When such a trigger event occurs, then step 130 then loads the counter value into the counter store 110, 112, 114, 116 of the associated transaction master 86, 88, 90, 92. If the count value is incremented on a regular basis, then the incremented counter value may be loaded into all of the counter stores 110, 112, 114, 116. The locally stored counter value serves as the subject control value for each of the transaction masters 86, 88, 90, 92. The counter store 110, 112, 114, 116 may form part of the local cache memory 94, 96, 98, 100, as such transactions will be routed through these cache memories.

FIG. 7 illustrates the behaviour of the embodiment of FIG. 5 when an STREX instruction is decoded within one of the transaction masters 86, 88, 90, 92. At step 132 processing waits until an STREX instruction is decoded. Step 134 determines whether or not the data concerned is present and valid within the local cache memory 94, 96, 98, 100 of the transaction master 86, 88, 90, 92 which decoded the STREX instruction. If the data is not present and loaded, then processing proceeds to step 136 where the STREX instruction is marked as failing as previously described. If the data is present and valid, then processing proceeds to step 138 where a determination is made as to whether or not that data is marked as unique within the local cache memory 94, 96, 98, 100 concerned. If the data is marked as unique, then step 140 serves to store the data of the STREX instruction into the local cache memory 94, 96, 98, 100 and processing proceeds to step 142 where the STREX instruction is marked as passing.

If the determination at step 138 is that the data concerned is not marked as unique, then step 144 serves to issue signals indicating the decoding of the STREX instruction to the coherent interconnect circuitry 102 together with a copy of the previously stored count value associated with the transaction master $TM_y$. Step 148 within the monitoring circuitry 104 determines whether or not the received count value from the transaction master $TM_y$ which decoded the STREX instruction matches the current count value of the counter 108. If there is not a match, then processing proceeds to step 136 and the STREX instruction is marked as failing. The non-matching of the count values indicates that another transaction master has previously succeeded in executing its own STREX instruction and has incremented the counter value so that it no longer matches the counter value which is locally stored by the transaction master $TM_y$.

If the received count value equals the current count value as determined at step 148, then processing proceeds to step 150 where the data value is stored into the local cache memory 94, 96, 98, 100. Step 152 then triggers invalidation of any old copies of that data stored in other local caches of other transaction masters 86, 88, 90, 92 as well as incrementing the count value stored within the counter 108 of the monitoring circuitry 104. Step 142 marks the STREX instruction as passing. Step 150 and 152 may be reversed in order in some embodiments.

The embodiment of FIGS. 5, 6 and 7 uses a counter 108 that will have a finite maximum count value and may then wrap back to zero. This causes a potential problem that a transaction master may still be holding a subject state variable with a value of zero even though other STREX instructions have succeeded and the subject control value changed through its maximum range since that sample of the counter was taken. This may cause the transaction master holding the old sampled value to succeed due to the counter wrap when it should fail. (The old value and the new post-wrap value need not be zero). This could cause a live-lock or other erroneous operation with, for example, the transaction master holding the old sample overlapping with a further transaction that caused the wrap and issuing invalidates to the master that issued the further transaction. This effect could continue with the transaction master that issued the further transaction serving to incorrectly invalidate another transaction so that a cycle of erroneous invalidates causes a live-lock. One way of addressing this problem would be the provision of a mechanism to send a message to all transaction masters to indicate that any locally held copy of the counter should be invalidated or resampled. This could be triggered on a counter wrap. Another possibility is if the counter has strictly more states than the number of transaction masters connecting to the point of serialization (monitoring circuitry), then the "domino effect" will reach an end and a cycle of erroneous invalidates will be avoided. After the domino chain has finished, the next STREX to succeed will be using the correctly sampled value of the current counter value and thus forward progress will be made and perpetual live-lock avoided.

FIG. 8 schematically illustrates a further example embodiment. In this embodiment a cluster of transaction masters 154 has coherent interconnect circuitry 156 including monitoring circuitry 158. Arbitration and serialisation between STREX instructions of the cluster 154 is performed within that cluster using the monitoring circuitry 158 of the coherent interconnect circuitry 156 and the techniques previously described. If an STREX instruction is passed within the cluster 154, then further arbitration is performed against further transaction masters 160, 162 which are connected to further coherent interconnect circuitry 164 containing further monitoring circuitry 166. Thus, there is a hierarchy of arbitration performed and arbitration can be performed both within a cluster and between clusters at higher levels. The monitoring circuitry 158 and the further monitoring circuitry 166 can both utilise either the flags or the counter mechanisms previously described.

The embodiment of FIG. 5 is shown within a single counter value. It would also be possible to provide multiple counter values each associated with different ranges of addresses, these ranges of addresses could be fixed or programmable. It is also possible to provide flags with no address range associated therewith. Such flags could be used as a default if all address capable resources are already in use.

The invention claimed is:

1. A method managing data coherency within a data processing apparatus having a plurality of transaction masters connected via a coherent interconnect and including a subject transaction master, said method comprising performing in respect of each of said plurality of transaction masters serving as a subject transaction master the steps of:
   setting a subject state variable and a subject control value to match so as to indicate an exclusive store access state to subject data within a subject cache memory coupled to said subject transaction master; and
   in response to a store-exclusive instruction for execution by said subject transaction master:
      comparing a store address of a store data value associated with said store-exclusive instruction with addresses of data values stored within said subject cache memory to determine if said store data value is currently stored within said target cache memory and is valid;
      if said stored data value is not marked as valid within said subject cache memory, then marking as failed execution of said store-exclusive instruction; and
      if said stored data value is valid within said subject cache memory, then issuing a signal indicative of said store exclusive instruction to said coherent interconnect to trigger said coherent interconnect to perform the steps of:
         (i) comparing a current value of said subject state variable with said subject control value;
         (ii) if said current value does not match said subject control value, then marking as failed execution of said store-exclusive instruction; and
         (iii) if said current value does match said subject control value, then permitting execution of said store-exclusive instruction to pass and changing, for each other transaction master of said plurality of transaction masters using a current value of a state variable to track an exclusive store access state of said other transaction master and corresponding to said store address, one of said current value and a control value associated with said other transaction master such that a subsequent store-exclusive instruction for execution by said other transaction master and corresponding to said exclusive store access state will not be executed with success by said other transaction master;

wherein if said stored data value is marked as valid and uniquely stored within said subject cache memory, then said store-exclusive instruction is permitted to execute without any dependence upon said subject control value and without issuing said store-exclusive instruction to said coherent interconnect.

2. The method as claimed in claim 1, wherein said step of setting is performed in response to a load-exclusive instruction executed by said subject transaction master, said load-exclusive instruction loading a load data value to said subject cache memory coupled to said subject transaction master if said load data value is not already present within said subject cache memory.

3. The method as claimed in claim 1, wherein if execution of said store-exclusive instruction is marked as failed, then a failure status is recorded and if execution of said store-exclusive instruction is permitted to pass, then a pass status is recorded.

4. The method as claimed in claim 1, wherein said store-exclusive instruction performs a standard store operation if said data value is marked as valid and said current value matches said subject control value.

5. The method as claimed in claim 1, wherein, if said current value does match said subject control value, then marking as invalid any data values stored in said other transaction masters of said plurality of transaction masters corresponding to said store address and if said current value does not match said subject control value, then not marking as invalid any data values stored in said other transaction masters of said plurality of transaction masters corresponding to said store address.

6. The method as claimed in claim 1, comprising the step of storing within coherency control circuitry shared by said plurality of transaction masters at least one separate state variable tracking for each of said plurality of transaction masters one or more pending exclusive store access states.

7. The method as claimed in claim 6, wherein said steps of comparing said current value with said subject control value and changing are performed by said coherency control circuitry.

8. The method as claimed in claim 7, wherein said subject control value is a predetermined set value and said step of changing sets said current value of said state variable for each of said other transaction masters to a predetermined reset value.

9. The method as claimed in claim 6, wherein said coherency control circuitry stores a plurality of separate state variables for each of said plurality of transaction masters, each of said plurality of state variables being associated with pending exclusive store access states of different address ranges.

10. The method as claimed in claim 9, wherein each of said different address ranges is one of:
(i) a fixed address range; or
(ii) a programmable address range, said subject transaction master operating to transmit data indicative of said store address to said coherency control circuitry for comparison with said programmable address range.

11. The method as claimed in claim 1, comprising the step of storing within coherency control circuitry shared by said plurality of transaction masters at least one counter value, wherein said counter value is said subject control value, said subject state variable comprises a sample of said counter value associated with said exclusive store access state and said step of changing is performed within said coherency control circuitry and changes said counter value.

12. The method as claimed in claim 11, wherein said subject control value is stored within said subject cache memory.

13. The method as claimed in claim 11, wherein said counter value is provided to said subject cache memory as one of:
a sideband signal;
an out-of-band signal; and
a data payload within an in-band signal.

14. The method as claimed in claim 11, wherein said counter value is sampled by said subject transaction master upon one of:
an instruction is fetched by said subject transaction master from an address that previously contained one of a load-exclusive instruction or a store-exclusive instruction;
decoding by said subject transaction master of one of a load-exclusive instruction or a store-exclusive instruction; or
when said counter value has not been sampled for greater than a predetermined number of processing cycles.

15. The method as claimed in claim 11, wherein said coherency control circuitry comprises a plurality of counters, each of said plurality of counters being associated with pending exclusive store access states of different address ranges.

16. A method as claimed in claim 15, wherein each of said different address ranges is one of:
(i) a fixed address range; or
(ii) a programmable address range, said subject transaction master operating to transmit data indicative of said store address to said coherency control circuitry to select which of said plurality of counters is sampled to provide said subject control value.

17. A method as claimed in claim 1, wherein
said plurality of transaction masters comprise a cluster of transaction masters between which any overlapping exclusive store access states and store-exclusive instructions are arbitrated using said subject control value,
said cluster is part of a system containing one or more further transaction masters; and
if a store-exclusive instruction is permitted within said cluster, then a further arbitration against any overlapping exclusive store access state and store-exclusive instruction of said one or more further transaction masters is performed using steps corresponding to those used within said cluster.

18. Apparatus for managing data coherency within a data processing apparatus having a plurality of transaction masters connected via a coherent interconnect and including a subject transaction master, said apparatus comprising in respect of each of said plurality of transaction masters serving as a subject transaction master:
state setting circuitry configured to set a subject state variable and a subject control value to match so as to indicate an exclusive store access state to subject data within a subject cache memory coupled to said subject transaction master;

monitor circuitry configured to respond to a store-exclusive instruction for execution by said subject transaction master by:
    comparing a store address of a store data value associated with said store-exclusive instruction with addresses of data values stored within said subject cache memory to determine if said store data value is currently stored within said target cache memory and is valid;
    if said stored data value is not marked as valid within said subject cache memory, then marking as failed execution of said store-exclusive instruction; and
    if said stored data value is valid within said subject cache memory, then issuing a signal indicative of said store exclusive instruction to said coherent interconnect to trigger said coherent interconnect to perform the steps of:
        (i) comparing a current value of said subject state variable with said subject control value;
        (ii) if said current value does not match said subject control value, then marking as failed execution of said store-exclusive instruction; and
        (iii) if said current value does match said subject control value, then permitting execution of said store-exclusive instruction and changing, for each other transaction master of said plurality of transaction masters using a current value of a state variable to track an exclusive store access state of said other transaction master and corresponding to said store address, one of said current value and a control value associated with said other transaction master such that a subsequent store-exclusive instruction for execution by said other transaction master and corresponding to said exclusive store access state will not be executed with success by said other transaction master;
    wherein if said stored data value is marked as valid and uniquely stored within said subject cache memory, then said store-exclusive instruction is permitted to execute without any dependence upon said subject control value and without issuing said store-exclusive instruction to said coherent interconnect.

19. Apparatus for managing data coherency within a data processing apparatus having a plurality of transaction masters connected via a coherent interconnect and including a subject transaction master, said apparatus comprising in respect of each of said plurality of transaction masters serving as a subject transaction master:

state setting means for setting a subject state variable and a subject control value to match so as to indicate an exclusive store access state to subject data within a subject cache memory coupled to said subject transaction master;
monitor means for responding to a store-exclusive instruction for execution by said subject transaction master by:
    comparing a store address of a store data value associated with said store-exclusive instruction with addresses of data values stored within said subject cache memory to determine if said store data value is currently stored within said target cache memory and is valid;
    if said stored data value is not marked as valid within said subject cache memory, then marking as failed execution of said store-exclusive instruction; and
    if said stored data value is valid within said subject cache memory, then issuing a signal indicative of said store exclusive instruction to said coherent interconnect to trigger said coherent interconnect to perform the steps of:
        (i) comparing a current value of said subject state variable with said subject control value;
        (ii) if said current value does not match said subject control value, then marking as failed execution of said store-exclusive instruction; and
        (iii) if said current value does match said subject control value, then permitting execution of said store-exclusive instruction and changing, for each other transaction master of said plurality of transaction masters using a current value of a state variable to track an exclusive store access state of said other transaction master and corresponding to said store address, one of said current value and a control value associated with said other transaction master such that a subsequent store-exclusive instruction for execution by said other transaction master and corresponding to said exclusive store access state will not be executed with success by said other transaction master;
    wherein if said stored data value is marked as valid and uniquely stored within said subject cache memory, then said store-exclusive instruction is permitted to execute without any dependence upon said subject control value and without issuing said store-exclusive instruction to said coherent interconnect.

\* \* \* \* \*